United States Patent [19]

Oshikoshi et al.

[11] 4,450,485
[45] May 22, 1984

[54] IMAGE SCANNING AND RECORDING METHOD

[75] Inventors: Yuji Oshikoshi; Toshitaka Agano, both of Minami-ashigara, Japan

[73] Assignee: Fuji Photo Film Co., Ltd., Minami-ashigara, Japan

[21] Appl. No.: 379,343

[22] Filed: May 18, 1982

[30] Foreign Application Priority Data

May 22, 1981 [JP] Japan ................................ 56-78329

[51] Int. Cl.³ .............................................. H04N 1/40
[52] U.S. Cl. .................................... 358/298; 358/283; 358/302
[58] Field of Search ........................ 358/283, 298, 302

[56] References Cited

U.S. PATENT DOCUMENTS

3,916,096 10/1975 Everett ................................ 358/283
4,032,978 6/1977 Wong .................................. 358/283
4,033,443 7/1977 Bunge ................................ 358/283
4,340,912 7/1982 Troxel ................................ 358/283

Primary Examiner—Howard W. Britton
Attorney, Agent, or Firm—Fleit, Jacobson, Cohn & Price

[57] ABSTRACT

An image scanning and recording method wherein a random pulse signal is added either to the image signal obtained by scanning a continuous tone original or to the dot signal controlled synchronously with the scanning of the original. The image signal and the dot signal are compared with each other to obtain a randomized dot image signal. A light beam is on-off modulated by a light modulator in accordance with the randomized dot image signal, and a photosensitive recording medium is scanned with the on-off modulated light beam so as to record thereon a dot image corresponding to the continuous tone original. The random pulse signal is added to a peak portion and/or a middle level portion of the dot signal. Alternatively, the random pulse signal is added contiguously either to the whole dot signal or to the whole image signal.

8 Claims, 27 Drawing Figures

IMAGE SCANNING AND RECORDING METHOD

BACKGROUND OF THE INVENTION

1. Field of the Invention

This invention relates to an improvement in an image recording method in which a light beam is on-off modulated based on an image signal obtained by scanning a continuous tone original, and a photosensitive recording medium is scanned with the on-off modulated light beam to record a dot image corresponding to the continuous tone original.

2. Description of the Prior Art

Figure 1:
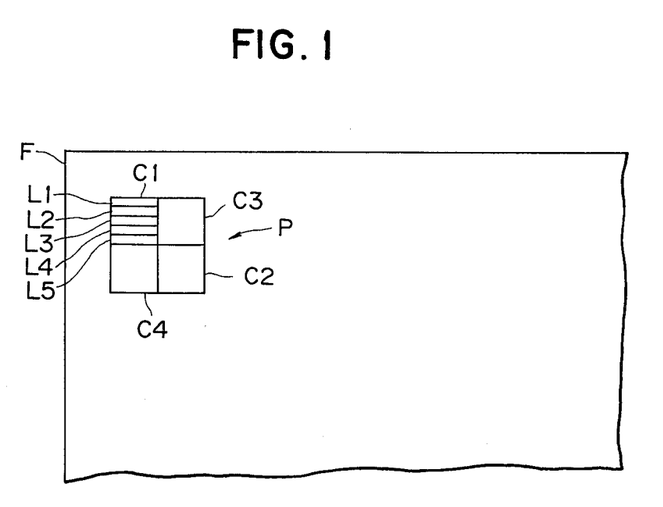
FIG. 1 is a schematic view showing the configuration of one picture element of a reproduced image.

Conventionally, the image scanning and recording method of the type described above is conducted for example as described below. The descriptions below refer to the case where one picture element P of the image reproduced on a photosensitive recording medium F consists of the first to fourth cells C1 to C4, and each cell consists of the first to fifth lines L1 to L5 as shown in FIG. 1, which schematically shows the configuration of one picture element of a reproduced image. In this case, a single cell is formed by five scannings with the light beam. Usually, a laser beam is used as the light beam. Therefore, the image scanning and recording method is described below with respect to a laser beam used as the light beam for scanning. FIG. 1 is an extremely enlarged view of the picture element P, but actually the picture element P is generally of a size of about 225 μm×225 μm. Further, in the descriptions below, the cell and line are designated simply by reference characters C and L respectively, except where a particular cell or line is to be designated.

Figure 2A:
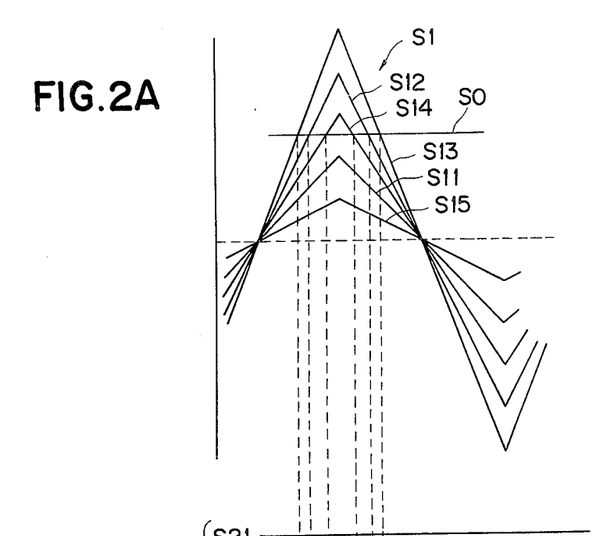
FIGS. 2A, 2B, 2C, 3A, 3B, 3C, 4A, 4B and 4C are explanatory views showing ways of recording an image on a photosensitive recording medium by scanning it with a laser beam.
Figure 2B:
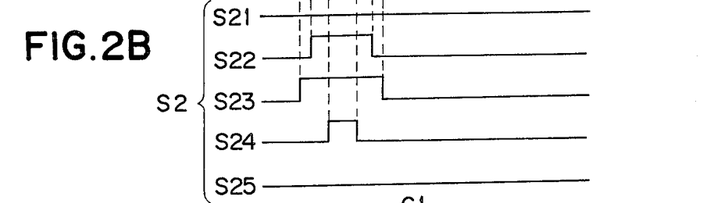
Figure 2C:
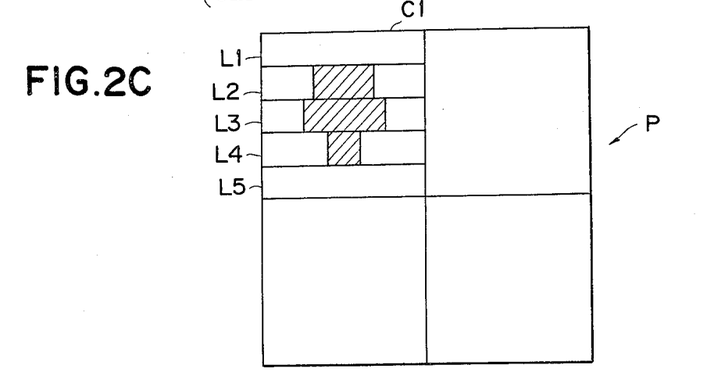

FIGS. 2A to 2C are explanatory views showing the manner of recording an image on a photosensitive recording medium by scanning the medium with a laser beam. In the conventional image scanning and recording method, a continuous tone image is first scanned with a laser beam and read to obtain an image signal S0 like that shown in FIG. 2A. The image signal S0 is compared with a triangular wave-like dot signal S1 to obtain a dot image signal S2 like that shown in FIG. 2B. As shown in FIG. 2A, the dot signal S1 consists of the first to fifth dot signals S11 to S15 which correspond to the respective lines L constituting the aforesaid cell C. The dot signals S11 to S15 are sequentially compared with the image signal S0 to form the first to fifth dot image signals S21 to S25 respectively as shown in FIG. 2B.

The dot image signals S21 to S25 thus formed are then input to a drive circuit of a light modulator to modulate the laser beam used for scanning the photosensitive recording medium. Thus the laser beam is modulated based on the dot image signals S21 to S25. This is done in such a way that, when the line L1 of the cell C1 is scanned with the laser beam, the first dot image signal S21 is input to the drive circuit of the light modulator. Therefore, the first line L1 is written on the photosensitive recording medium by being scanned with the laser beam which is on-off modulated based on the first dot image signal S21. Similarly, the second to fifth lines L2 to L5 are written on the recording medium by being scanned with the laser beams which are on-off modulated based on the second to fifth dot image signals S22 to S25. FIG. 2C shows the first cell C1 written on the recording medium.

With the image recording method in which dots are formed and recorded as described above, it is possible to reproduce a continuous tone original into a dot image having a continuous dot image gradation which is fairly satisfactory. With this method, however, gradation jumps in the dot area ratio of between about 1% and 3% occur five times in the 0% to 50% dot area region (when each cell consists of five lines) and five times in the 50% to 100% dot area region (when each cell consists of five lines). As a result, "streaks" develop at the gradation jump sections particularly in the skin color region of the reproduced image.

The reason why the gradation jumps occur in the 0% to 50% dot area region is explained below with reference to FIGS. 3A to 3C and 4A to 4C.

Figure 3A:
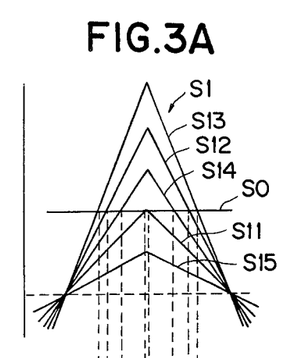
Figure 3B:
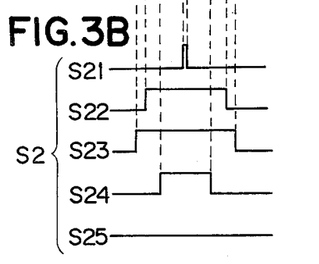
Figure 3C:
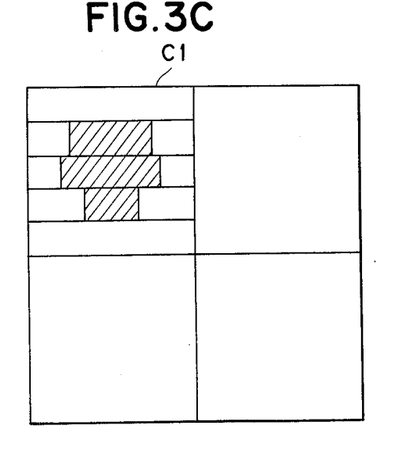

When the level of the image signal S0 drops from that shown in FIG. 2A to that coming upon the dot signal S11 as shown in FIG. 3A, a dot image signal S2 as shown in FIG. 3B is obtained by comparing the image signal S0 and the dot signal S1. The cell C1 is written on the recording medium as shown in FIG. 3C in accordance with the dot image signal S2. In comparing the cell C1 shown in FIG. 2C and that shown in FIG. 3C, it will be noted that the blackened section exists only on the second to fourth lines L2 to L4 in both cells, but the length of the blackened section differs therebetween (i.e. the length is longer in the case of the cell C1 shown in FIG. 3C). Thus, when the level of the image signal changes between the peaks of two dot signals whose levels are adjacent to each other, the change in the gradation of the image recorded on the recording medium is indicated by the change in the length of the blackened section on the line L. Accordingly, in this case, the gradation of the reproduced image changes analog-wise to yield the continuous gradation.

Figure 4A:
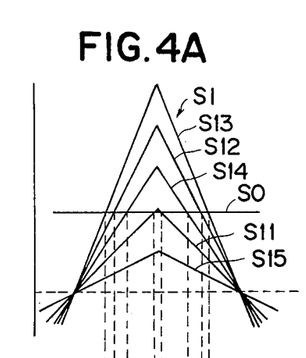
Figure 4B:
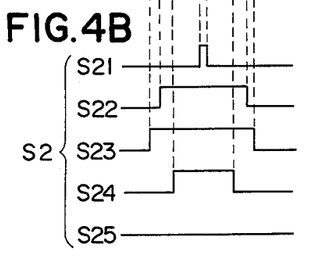
Figure 4C:
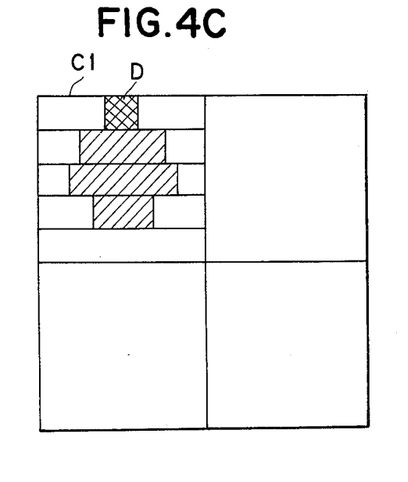

However, if the level of the image signal S0 slightly drops from that shown in FIG. 3A to that intersecting or slightly lower than the peak of the dot signal S11 as shown in FIG. 4A, a dot image signal S2 as shown in FIG. 4B is obtained by comparing the image signal S0 and the dot signals S11 to S15. From FIG. 4B, it will be understood that the on-state sections of the dot image signals S22 to S24 are slightly longer than those shown in FIG. 3B and, in addition, a short on-state section occurs in the first dot image signal S21. When the cell C1 is written on the recording medium based on the dot image signals S21 to S25, the lines L2 to L4 are blackened as shown in FIG. 4C and, in addition, a blackened section D is also formed on the first line L1. The blackened section D designates a dot having the minimum recordable size, which is stable on the recording medium F (the recording medium used in the dot image field is a photosensitive material exhibiting high gamma characteristics, such as lith film) and which has a sufficient density (optical density: 0.5 or more) to be printed on a printing plate. This blackened section D is hereinafter referred to as the minimum blackened unit. In FIG. 3B, the pulse width of the dot image signal S21 obtained by the comparison between the dot signal S11 and the image signal S0 is very short, so that no blackened dot develops on the line L1 in FIG. 3C. Thus, the dot image signal S21 having a very short pulse width does not cause the blackened section to occur according to the pulse width of S21 if the ultrasonic modulator has low high-frequency response characteristics, if the laser beam is a Gaussian beam, or if a photosensitive material having high gamma characteristics such as lith film is used. As described above, in the cases of FIGS. 2A to 2C and 3A to 3C, the gradation continuously changes with an increase in the length of the blackened section. However, when the image signal S0 intersects the peak of the dot signal S1, the blackened section increases in increments of the minimum blackened unit D, i.e. digitally and discontinuously, and therefore the gradation also increases digitally and discontinuously. Accordingly, a gradation jump develops at this time.

For example, when the spot size of the laser beam is 25 μm×25 μm, the size of the minimum blackened unit is about 20 μm×20 μm. When the screen angle is 45°, two minimum blackened dots can be contained (at C1 and C2 in FIG. 1) in one picture element P (225 μm×225 μm). In this case, the dot area changes about 2%.

The reason why the gradation jumps develop in the 50% to 100% dot area region in now explained below with reference to FIGS. 15A to 15C and 16A to 16C.

Figure 15A:
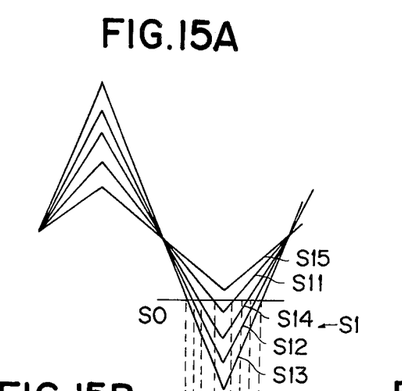
FIGS. 15A, 15B and 15C and 16A, 16B and 16C are explanatory views showing ways of recording an image on a photosensitive recording medium by scanning it with a laser beam.
Figure 15B:
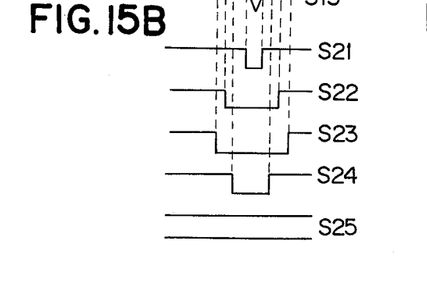
Figure 15C:
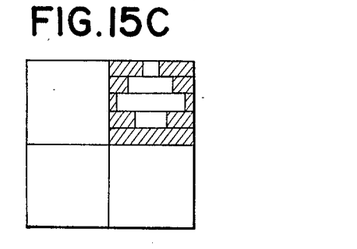
Figure 16A:
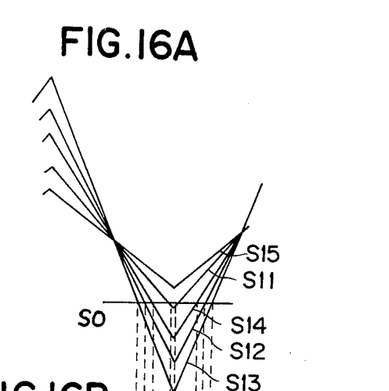
Figure 16B:
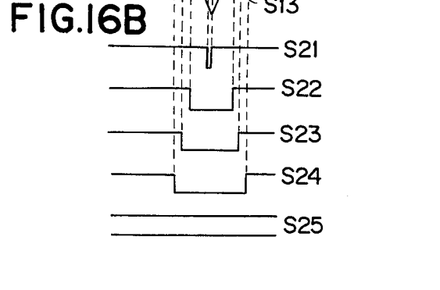
Figure 16C:
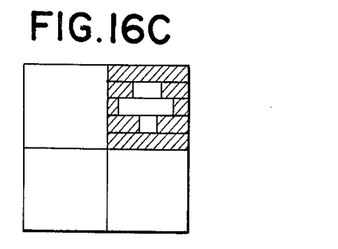

When the level of the image signal S0 is at the position shown in FIG. 15A, a dot image signal S2 as shown in FIG. 15B is obtained by the comparison between the image signal S0 and the dot signal S1. The cell C is written on the recording medium as shown in FIG. 15C in accordance with the dot image signal S2. Then, if the level of the image signal S0 slightly drops from that shown in FIG. 15A to that shown in FIG. 16A, a dot image signal S2 as shown in FIG. 16B is obtained by the comparison between the image signal S0 and the dot signal S1. The cell C is written on the recording medium as shown in FIG. 16C in accordance with the dot image signal S2 shown in FIG. 16B.

In the case of FIG. 16B, the pulse width of the dot image signal S21 obtained by the comparison between the dot signal S11 and the image signal S0 is very short, and a minimum transparent or unblackened dot (hereinafter referred to as the minimum unblackened unit) develops on the line L1 in FIG. 15C. On the other hand, the minimum unblackened unit is abruptly blackened and disappears on the line L1 in FIG. 16C.

The aforesaid minimum unblackened unit has a sufficiently low fog density (optical density: 0.2 or less) for the printing of the printing plate and has the minimum size that can form an unblackened section.

When the dot image signal S21 has a very short pulse width as shown in FIG. 16B, the unblackened section corresponding to the pulse width of S21 is not reproduced and the whole line L1 is blackened if the ultrasonic modulator has low high-frequency response characteristics, if the laser beam is a Gaussian beam, or if a photosensitive material having high gamma characteristics such as lith film is used. Thus, in the case of FIGS. 16A to 16C, the blackened section increases in increments of the minimum unblackened unit. Accordingly, the gradation changes digitally and discontinuously, resulting in a gradation jump.

Figure 5A:
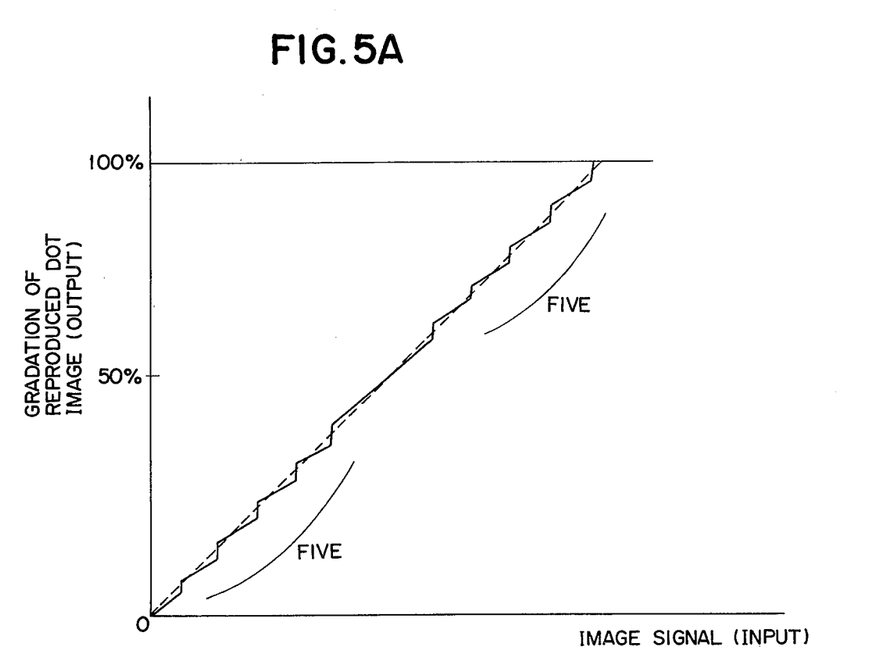
FIG. 5A is a graph showing the relationship between the image signal and the gradation of the image reproduced by use of the image scanning and recording method in accordance with the present invention and the conventional method.

FIG. 5A is a graph showing the relationship between the image signal and the gradation of the image reproduced by use of the image scanning and recording method in accordance with the present invention and the conventional method. As shown by the solid line in FIG. 5A, ten gradation jumps occur in case the cell C consists of five lines L. The broken line in FIG. 5A indicates the ideal relationship between the image signal (input) and the gradation of the reproduced dot image (output).

The above-mentioned gradation jumps occur also in the case where the photosensitive material is based on silver chloride as described below.

Namely, when the dot percentage is 50%, the cells C1 and C2 of the picture element P shown in FIG. 1 are wholly blackened. In this case, the contacting point between the cell C1 and the cell C2 tends to become thickened and blackened, and the gradation jumps to an extent corresponding to the area of the thickened and blackened point.

SUMMARY OF THE INVENTION

The primary object of the present invention is to provide an improved image scanning and recording method for recording a dot image corresponding to a continuous tone original.

Another object of the present invention is to provide an image scanning and recording method in which a light beam is on-off modulated based on an image signal obtained by scanning a continuous tone original, and a photosensitive recording medium is scanned with the on-off modulated light beam to record a dot image corresponding to the continuous tone original.

The specific object of the present invention is to provide an image scanning and recording method which eliminates gradation jumps in the reproduced image.

It has been found that a discontinuous change in the blackened section in each picture element leads to the aforesaid gradation jumps in the reproduced image as described below. Namely, when the level of the image signal reaches the specific level where the blackened section is to be increased or decreased by the quantity of the above-mentioned minimum blackened unit or the minimum unblackened unit (both are hereinafter referred to as the blackened unit), the blackened section changes (increases) digitally and discontinuously in increments of the blackened unit in all of the picture elements of the reproduced image that correspond to the portions of the original exceeding the above-described specific level. Accordingly, the gradation jumps (which are observed as streaks) develop in the reproduced image when the whole reproduced image is viewed macro-wise.

In the present invention, even when the level of the image signal of a portion of the original reaches the aforesaid specific level, all of the picture elements constituting the portion of the reproduced image which corresponds to the said portion of the original are not blackened by the quantity of the blackened unit. Instead, only some of the said picture elements selected randomly or simulatively randomly therefrom are allowed to be blackened by the quantity of the blackened unit, so that a continuous gradation can be obtained when the image reproduced from the continuous tone original is viewed macro-wise. Thus the image scanning and recording method in accordance with the present invention is characterized in that a random pulse signal is added either to the image signal obtained by scanning a continuous tone original or to the dot signal controlled synchronously with said scanning of the original, said image signal and said dot signal are compared with each other to obtain a randomized dot image signal, a light beam is on-off modulated by a light modulating means in accordance with said randomized dot image signal, and a photosensitive recording medium is scanned with said on-off modulated light beam so as to record thereon a dot corresponding to said continuous tone original.

DESCRIPTION OF PREFERRED EMBODIMENTS

The present invention will hereinbelow be described in further detail with reference to the accompanying drawings, particularly FIGS. 6 to 14.

Figure 6:
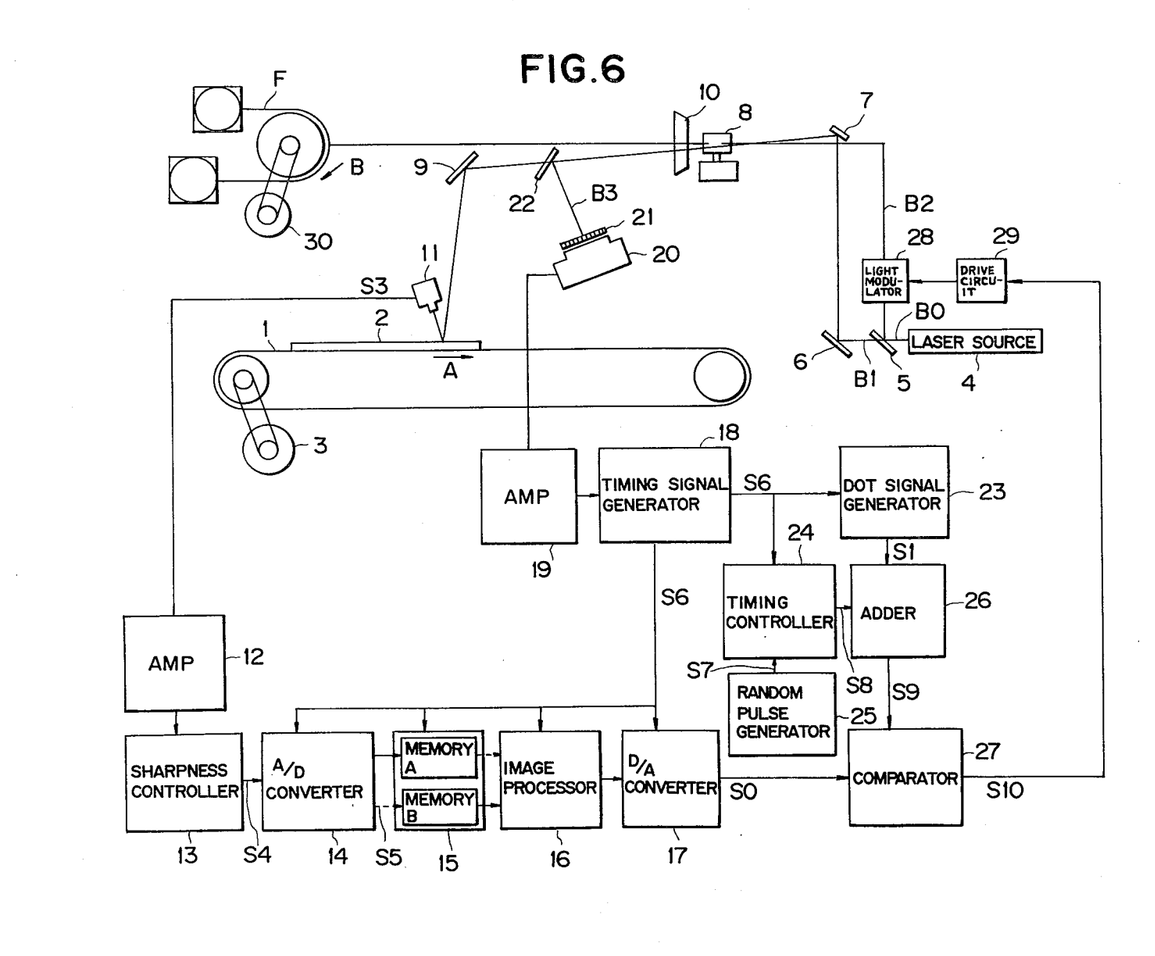
FIG. 6 is a schematic view showing a system for conducting an embodiment of the image scanning and recording method in accordance with the present invention.

FIG. 6 schematically shows a system for conducting an embodiment of the image scanning and recording method in accordance with the present invention.

In FIG. 6, an endless belt 1 supports an original 2 to be reproduced and moves it in the direction of arrow A. The endless belt 1 is driven by a motor 3.

A laser source 4 emits a laser beam B0, which is then split into an original reading beam (hereinafter referred to as the first beam) B1 and a beam B2 for recording an image on a photosensitive recording material (hereinafter referred to as the second beam) by a beam splitter 5. The first beam B1 is introduced into a deflector 8 such as galvanometer mirror via reflecting mirrors 6 and 7, and deflected by the deflector 8 so as to scan the original 2 perpendicularly to the direction of arrow A. The direction perpendicular to that of the arrow A is called the main scanning direction, and that of the arrow A is called the sub-scanning direction. A compensation lens 10 is positioned after the deflector 8 for the purpose of preventing the laser beam from becoming unsharp particularly in the vicinity of the ends of the scanning stroke.

Above the original 2 is positioned a light receiver 11 which receives the first beam B1 reflected from the surface of the original 2 and converts it to an electric original density signal S3. The original density signal S3 output from the light receiver 11 is amplified by an amplifier 12, and input to a sharpness controller 13 for adjusting the sharpness of the reproduced image. The signal S3 is thus converted to a sharpness-intensified signal S4 by the sharpness controller 13. The sharpness-intensified signal S4 is then input to an A/D converter 14, where it is converted to a digital image signal S5. The digital image signal S5 thus obtained in temporarily stored in a digital memory A (15A).

A digital memory B (15B) stores a digital image signal corresponding to the previous scanning line, which has been obtained in the scanning period just before the aforesaid digital image signal S5 is obtained.

In the same scanning period as when the digital image signal S5 is written into the digital memory A (15A), the previously stored digital image signal is read from the digital memory B (15B). Namely, the previous digital image signal is read from the memory B simultaneously with the writing of the same signal next to said previous digital image signal into the memory A. In the next scanning cycle, the image signal stored in the memory A is read out simultaneously with the writing of the next image signal into the memory B.

At this time, the magnification in the main scanning direction can be changed by appropriately changing the write clock and the read clock. Further, the magnification in the sub-scanning direction can also be changed by changing the ratio of the feed amount of the original to that of the photosensitive recording medium.

Thereafter, the digital image signal S5 read out of the digital memory A (15A) is compensated for gradation by an image processor 16, and then converted to an analog image signal S0 by a D/A converter 17.

The timings of the above-mentioned A/D converter 14, digital memories A and B (15A, 15B), image processor 16 and D/A converter 17 are controlled by a timing signal S6 sent from a timing signal generator 18. The timing signal generator 18 is connected to a light receiver 20 via an amplifier 19. In front of the light receiver 20 is positioned a grid plate 21 formed by a grid of approximately the same pitch as that of the picture elements. A beam splitter 22 is positioned between the aforesaid lens 10 and the reflecting mirror 9 so as to split the first beam B1 and direct part thereof (a third beam B3) to the grid plate 21. The third beam B3 scans the grid plate 21, and the beam transmitted through the grid plate 21 is received by the light receiver 20. Upon receiving the third beam B3, the light receiver 20 generates a grid signal. The timing signal generator 18 generates the timing signal S6 based on the grid signal sent from the light receiver 20.

The timing signal generator 18 is also connected to a dot signal generator 23, which controlled by the timing signal S6 sent from the timing signal generator 18 and generates the dot signal S1 mentioned above with reference to FIG. 2A or the like. Stated differently, the dot signal generator 23 is controlled synchronously with the scanning of the laser beam on the original 2.

The timing signal generator 18 is also connected with a timing controller 24, which times a random pulse signal S7 (see FIG. 7) of a random pulse signal generator 25 by use of the timing signal S6 so as to output the signal S7 intermittently and periodically. Thus the timing controller 24 serves as a gate for passing the signal intermittently and periodically therethrough. The intermittent random pulse signal which is output from the timing controller 24 is designated by reference character S8 shown in FIG. 7.

Figure 7:
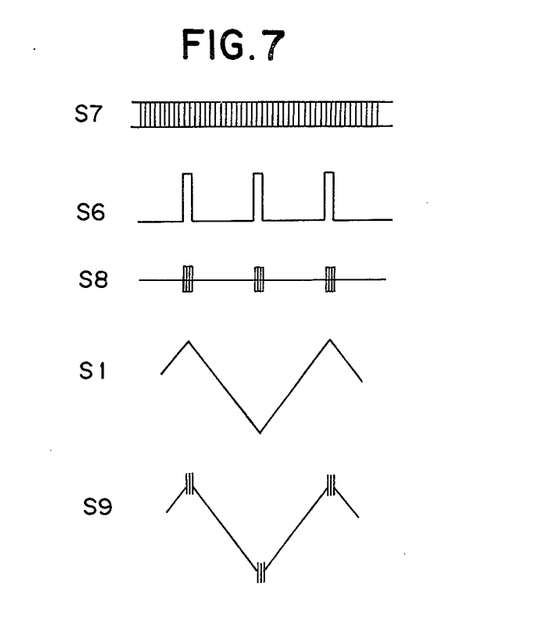
FIG. 7 is an explanatory view showing the signal processing used to obtain the randomized dot signal in accordance with the embodiment of the method in accordance with the present invention shown in FIG. 6.

Output terminals of the dot signal generator 23 and the timing controller 24 are connected to the input terminal of an adder 26. AS shown in FIG. 7, the adder 26 adds the above-mentioned random pulse signal S8 to the peaks of the dot signal S1 so as to obtain a randomized dot signal S9. In FIG. 7, only one dot signal S1 is shown for simplicity of explanation.

Figure 8:
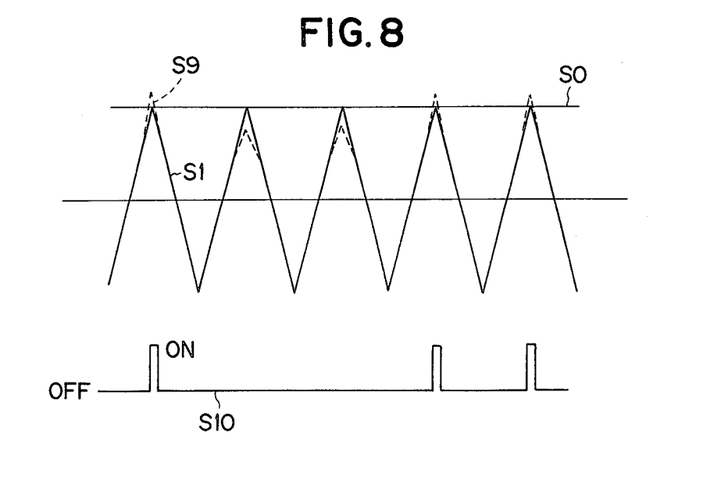
FIG. 8 is an explanatory view showing the manner of comparison between the image signal and the randomized dot signal shown in FIG. 7, FIGS. 9, 10 and 11 are schematic views showing various randomized dot signals used in further embodiments of the method in accordance with the present invention.

As shown by the broken line in FIG. 8, the randomized dot signal S9 is the dot signal S1 with the levels of the peaks fluctuated randomly.

The above-described randomized dot signal S9 is output from the adder 26 to a comparator 27. The comparator 27 compares the randomized dot signal S9 and the image signal S0 sent from the D/A converter 17 as described with reference to FIGS. 2a, 2B, 2C and the like, and generates a randomized dot image signal S10. The randomized dot image signal S10 thus generated is input to a drive circuit 29 for a light modulator 28 to on-off modulate the second beam B2. The drive circuit 29 drives the light modulator 28 in accordance with the randomized dot image signal S10 so as to on-off modulate the second beam B2. The second beam B2 thus on-off modulated is sent through the aforesaid modulator 8 to scan a photosensitive recording medium F which is moved by a motor 30 in the sub-scanning direction designated by an arrow B. This scanning occurs perpendicularly to the direction of the arrow B, i.e. in the main scanning direction. In this way, the recording medium F is exposed to the on-off modulated second beam B2 to record the image information.

Figure 5B:
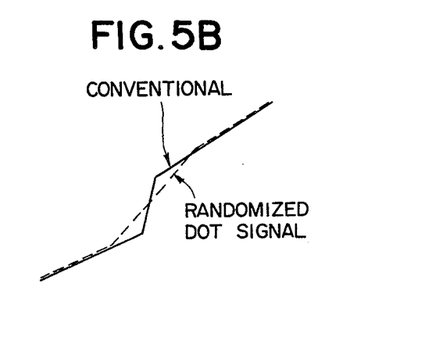
FIG. 5B is a fragmentary enlarged view of FIG. 5A.

Referring again to FIG. 8, the randomized dot signal S9 has random levels of peak values. Accordingly, when the image signal S0 has a level as shown in FIG. 8 (the level slightly intersecting the peaks of the non-randomized dot signal S1), the randomized dot image signal S10 obtained by comparing the image signal S0 and the randomized dot signal S9 goes to the on state at random, unlike the case of the conventional method. As described above, the image information is recorded on the photosensitive recording medium F by the second beam B2 on-off modulated based on the randomized dot signal S10. As a result, the blackened section on the photosensitive recording medium F increases in increments of the blackened unit in the randomly selected picture elements R. Therefore, when the image information is reproduced on the recording medium F in accordance with the present invention, the reproduced image is macro-wise observed to exhibit continuous gradation for the reason described above. FIG. 5B shows the relationship between the image signal and the gradation of the reproduced dot image by the solid line for the conventional method and the broken line for the method of the present invention. From FIG. 5B, it will be noted that the image reproduced in accordance with the present invention exhibits greatly moderated gradation jumps compared with the sharp gradation jumps developed in the image reproduced according to the conventional method.

Figure 9:
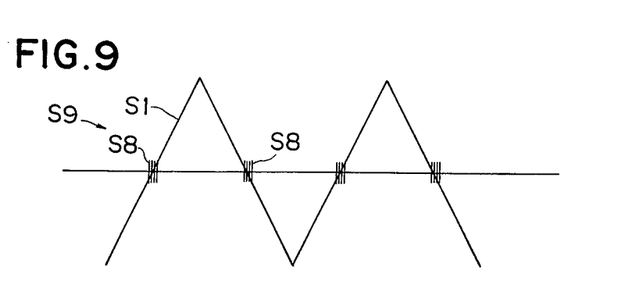

FIG. 9 shows another randomized dot signal used in another embodiment of the method in accordance with the present invention.

The randomized dot signal S9 shown in FIG. 9 can be obtained by use of the same system as that shown in FIG. 6 for conducting the method of the present invention.

In FIG. 9, the intermittent random pulse signal S8 is added to the middle (or intermediate) level of the dot signal S1 so as to obtain the randomized dot signal S9 as shown. The randomized dot signal S9 is then compared with the image signal S0 by the comparator 27 to generate a randomized dot image signal.

With the randomized dot signal S9 as shown in FIG. 9, the joining of the blackened sections of the cells adjoining each other when the dot percentage is in the vicinity of 50% is randomized. Therefore, it is possible to prevent the gradation jumps as described above.

Figure 10:
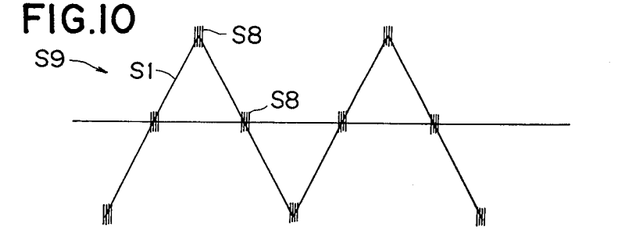

FIG. 10 shows a further randomized dot signal used in another embodiment of the method in accordacne with the present invention.

The randomized dot signal S9 shown in FIG. 10 can be obtained by use of the same system as that shown in FIG. 6 for conducting the method of the present invention.

As shown in FIG. 10, the randomized dot signal S9 is a combination of those shown in FIGS. 7 and 9. Namely, it can be obtained by adding the intermittent random pulse signal S8 to the peaks and the middle level of the dot signal S1. The randomized dot signal S9 thus obtained is then compared with the image signal S0 by the comparator 27 to generate a randomized dot image signal.

With the randomized dot signal S9 as shown in FIG. 10, it is possible to prevent the gradation jumps when the level of the image signal equals that of the peak of the dot signal and those occurring when the dot percentage is 50%.

Figure 11:
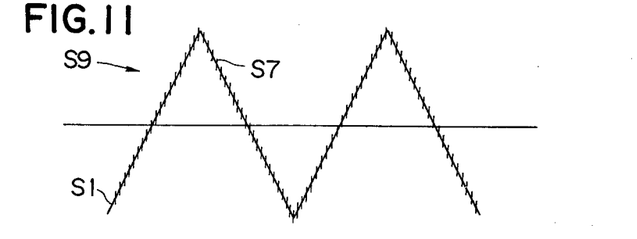

FIG. 11 shows a still further randomized dot signal used in another embodiment of the method in accordance with the present invention.

The randomized dot signal S9 shown in FIG. 11 can be obtained by use of the same system as that shown in FIG. 6 for conducting the method of the present invention. In this case, however, the timing controller 24 shown in FIG. 6 may be omitted because the random pulse signal S7 shown in FIG. 11 may directly be input to the adder 26 instead of passing it through the timing controller 24.

In FIG. 11, the random pulse signal S7 is contiguously added to the whole dot signal S1 to obtain the randomized dot signal S9 as shown. The randomized dot signal S9 is then compared with the image signal S0 by the comparator 27 to generate a randomized dot image signal.

With the randomized dot signal S9 as shown in FIG. 11, it is possible to obtain the same effects as those obtained with the signal S9 shown in FIG. 10.

Figure 12:
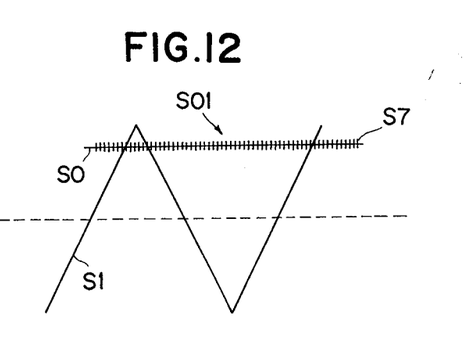
FIGS. 12 and 13 are respectively a circuit diagram showing the major components of the system for conducting another embodiment of the method in accordance with the present invention, and an explanatory view showing the manner of comparison between the randomized image signal and the dot signal in said embodiment.
Figure 13:
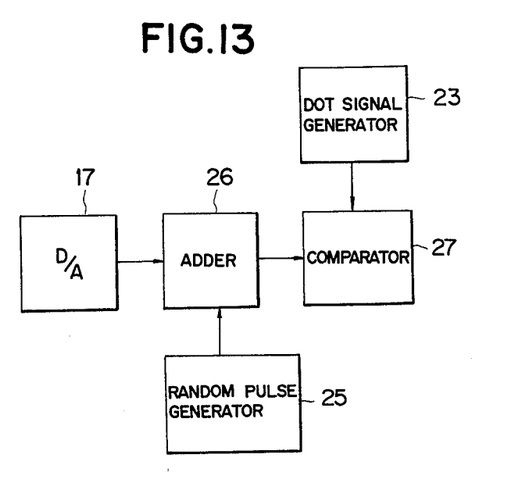

FIGS. 12 and 13 respectively show the major components of the system for conducting still another embodiment of the method in accordance with the present invention, and the manner of comparison between the randomized image signal and the dot signal in said embodiment.

In FIG. 12, the random pulse signal S7 is contiguously added to the whole image signal S0 to obtain a randomized image signal S01. The randomized image signal S01 is then compared with the dot signal S1 to generate a randomized dot image signal.

In FIG. 13, the system for conducting the method in accordance with the present invention by use of the randomized image signal S01 is the same as that shown in FIG. 6, except that the adder 26 is positioned between the D/A converter 17 and the comparator 27 and directly connected to the random pulse signal generator 25, and that the dot signal generator 23 is directly connected to the comparator 27. The comparator 27 compares the dot signal S1 and the randomized image signal S01 as shown in FIG. 12.

With the embodiment shown in FIGS. 12 and 13, it is possible to obtain the same effects as with the embodiments shown in FIGS. 10 and 11.

In the present invention, the random pulse signal S7 may be a truly random pulse signal having no regularity of repetition, or may be a simulatively random pulse signal having regularity of repetition.

Figure 14:
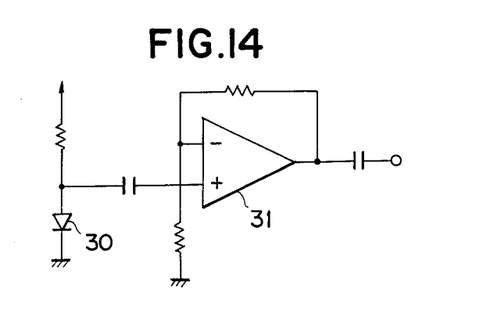
FIG. 14 is a circuit diagram showing an example of the random pulse signal generator used to conduct the method in accordance with the present invention.

The truly random pulse signal having no regularity of repetition can be obtained for example by using a circuit as shown in FIG. 14. In the circuit shown in FIG. 14, the alternating current component of the white noise generated from a diode 30 is amplified by an amplifier 31 to obtain a random pulse signal having no regularity of repetition.

The simulatively random pulse signal having regularity of repetition can be generated by a digital circuit. For example, it can be obtained by EXCLUSIVE-ORing the outputs of series shift registers and feeding the EXCLUSIVE-ORed signal back to the input of the series shift registers.

In the embodiments described above, the cell is referred to as consisting of five lines. However, the method in accordance with the present invention can also be applied to cells consisting of a different number of lines.

As described above, in the present invention, the image information is processed in such a way that the blackened section increases only in randomly selected picture elements when it increases in increments of the blackened unit. As a result, the reproduced image does not involve a large gradation jump when the whole image is observed macro-wise. Accordingly, the reproduced image does not exhibit streaks due to large gradation jumps.

We claim:

1. An image scanning and recording method for scanning a continuous tone original and recording a reproduction thereof on a recording medium, said method comprising the steps of:
    adding a random pulse signal to a selected one of an image signal obtained by scanning the continuous tone original and a dot signal controlled synchronously with said scanning of the original;
    comparing said image signal with said dot signal to obtain a randomized dot image signal;
    on-off modulating a light beam in accordance with said randomized dot image signal; and
    scanning a photosensitive recording medium with said on-off modulated light beam so as to record thereon a dot image corresponding to said continuous tone original.

2. A method as defined in claim 1 further comprising the step of adding said random pulse signal to said dot signal intermittently and periodically at time instances which are synchronous with said dot signal.

3. A method as defined in claim 1, further comprising the step of adding said random pulse signal to said dot signal at irregular periods of repetition.

4. A method as defined in claim 2 wherein said random pulse signal has regularity of repetition.

5. A method as defined in any of claims 1 to 4 wherein said random pulse signal is added to a selected one of a peak portion and a middle level portion of said dot signal.

6. A method as defined in claim 1 wherein said random pulse signal is added contiguously to a selected one of the whole dot signal and the whole image signal.

7. A method as defined in claim 6 wherein said random pulse signal does not have regularity of repetition.

8. A method as defined in claim 6 wherein said random pulse signal has regularity of repetition.

* * * * *